(12) United States Patent
Kudo

(10) Patent No.: US 6,920,466 B2
(45) Date of Patent: Jul. 19, 2005

(54) INFORMATION FILE RECORDING APPARATUS

(75) Inventor: Toshimichi Kudo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 363 days.

(21) Appl. No.: 10/014,061

(22) Filed: Dec. 10, 2001

(65) Prior Publication Data

US 2002/0078073 A1 Jun. 20, 2002

(30) Foreign Application Priority Data

Dec. 12, 2000 (JP) ........................................ 2000-377730

(51) Int. Cl.⁷ ............................................. G06F 17/30
(52) U.S. Cl. ................... 707/200; 707/104.1
(58) Field of Search .............................. 707/200, 205, 707/104.1, 206, 100, 102

(56) References Cited

U.S. PATENT DOCUMENTS

| | | | | |
|---|---|---|---|---|
| 5,838,967 A | * | 11/1998 | Okayama et al. | ........... 707/200 |
| 5,899,581 A | * | 5/1999 | Kawamura et al. | ......... 386/120 |
| 5,978,791 A | * | 11/1999 | Farber et al. | .................. 707/2 |
| 6,003,034 A | * | 12/1999 | Tuli | ........................... 707/101 |
| 6,189,016 B1 | * | 2/2001 | Cabrera et al. | ............. 707/203 |
| 6,212,512 B1 | * | 4/2001 | Barney et al. | ................. 707/1 |
| 6,230,212 B1 | * | 5/2001 | Morel et al. | ................ 719/316 |
| 6,256,642 B1 | * | 7/2001 | Krueger et al. | ............. 707/205 |
| 6,681,075 B1 | * | 1/2004 | Waki et al. | .................... 386/46 |

FOREIGN PATENT DOCUMENTS

JP 11-164234 6/1999

* cited by examiner

Primary Examiner—Greta Robinson
(74) Attorney, Agent, or Firm—Morgan & Finnegan, LLP

(57) ABSTRACT

A recording apparatus for creating under a directory a plurality of information files each having information data and creation date information, and recording the information files to a recording medium in which a name of the directory is changed according to a predetermined change in a range of the creation dates of the files being stored in the directory.

35 Claims, 4 Drawing Sheets

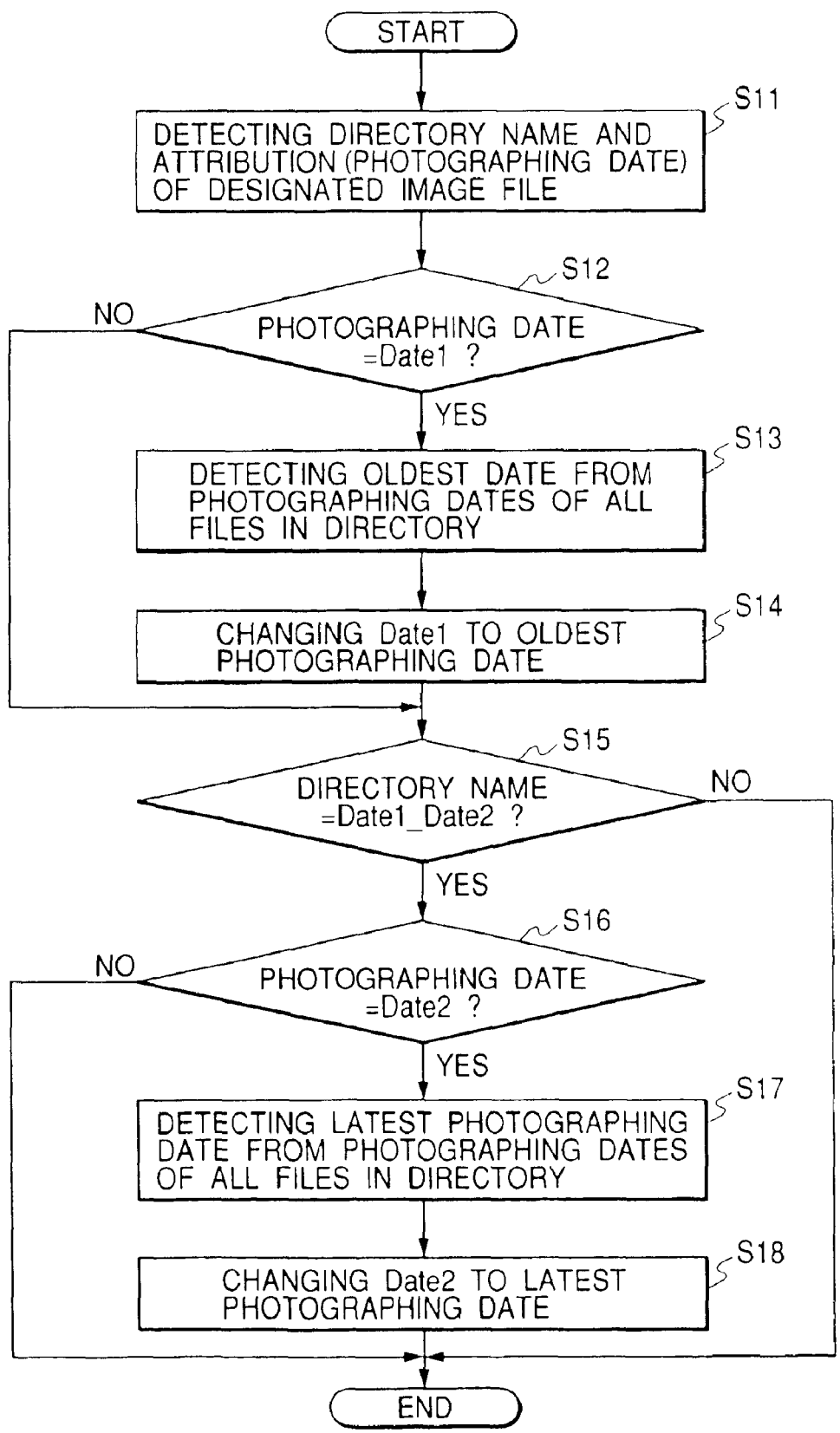

US 6,920,466 B2

INFORMATION FILE RECORDING APPARATUS

BACKGROUND OF THE INVENTION

1. Field of the Invention

The present invention relates to a recording apparatus, and more specifically to an apparatus for generating a directory and recording information files.

2. Related Background Art

In recent years many digital cameras have been put on the market. At present, many of the digital cameras on the market record photographed images onto a memory card that is removable from a main body of the camera. These digital cameras have a construction in which a file system in the memory card can be recognized by a personal computer, whereby an image file recorded on the memory card can be sent easily to the computer (referred to hereinafter as a "PC").

It is generally common for the file system in the memory card that the maximum number of image files which can be saved in one directory is limited by means of a file number or such, and a subsequent directory is created for image files which exceed the number to save them there. In this case, the camera automatically creates an image file name and a directory name at the time when the photographic image or the like is taken.

One example of such a method of generating a directory name is described in Japanese Patent Application Laid-open No. 11-164234. According to this, when a new directory is to be generated a directory name which includes a date and/or a time is created, so that the directory name will always be unique, and thus the directory name does not have to be changed when images are copied to the PC together with the directory.

However, according to the method described in the above document, while the time and date on which each directory was made can be readily understood, it is still difficult to know the time and date on which each of the image files saved in the directory were taken. In particular, in the case of that only one directory is copied onto the PC from among a plurality of directories created on the memory card, in order to confirm the range of the photographing dates of the image files stored in the directory, there is no choice but to open up that directory and refer to the recorded dates and times of each file, which is troublesome.

SUMMARY OF THE INVENTION

An object of the present invention is to solve the above-mentioned problems.

Another object of the present invention is to make attributions of the information files in the directory easily recognizable.

In order to attain these objects, according to one aspect of the present invention, there is provided a recording apparatus comprising: a recording medium interface arranged to create a plurality of information files under a directory and record the information files on a recording medium; a creation date detection means for detecting creation dates of the information files; and a control means for changing a name of the directory to a name indicating a creation date detected by the creation date detection means, according to a predetermined change in a storage state of the information files in the directory.

The other objects of the present invention and the features thereof will become apparent upon reading the following detailed description of the embodiments of the invention, referring to the accompanying drawings.

BRIEF DESCRIPTION OF THE DRAWINGS

In the accompanying drawings:

FIG. 4 is an operation flow chart of the embodiment of the present invention.

DETAILED DESCRIPTION OF THE PREFERRED EMBODIMENTS

Hereinafter, explanation will be made of an embodiment of the present invention, making reference to the drawings.

Figure 1:
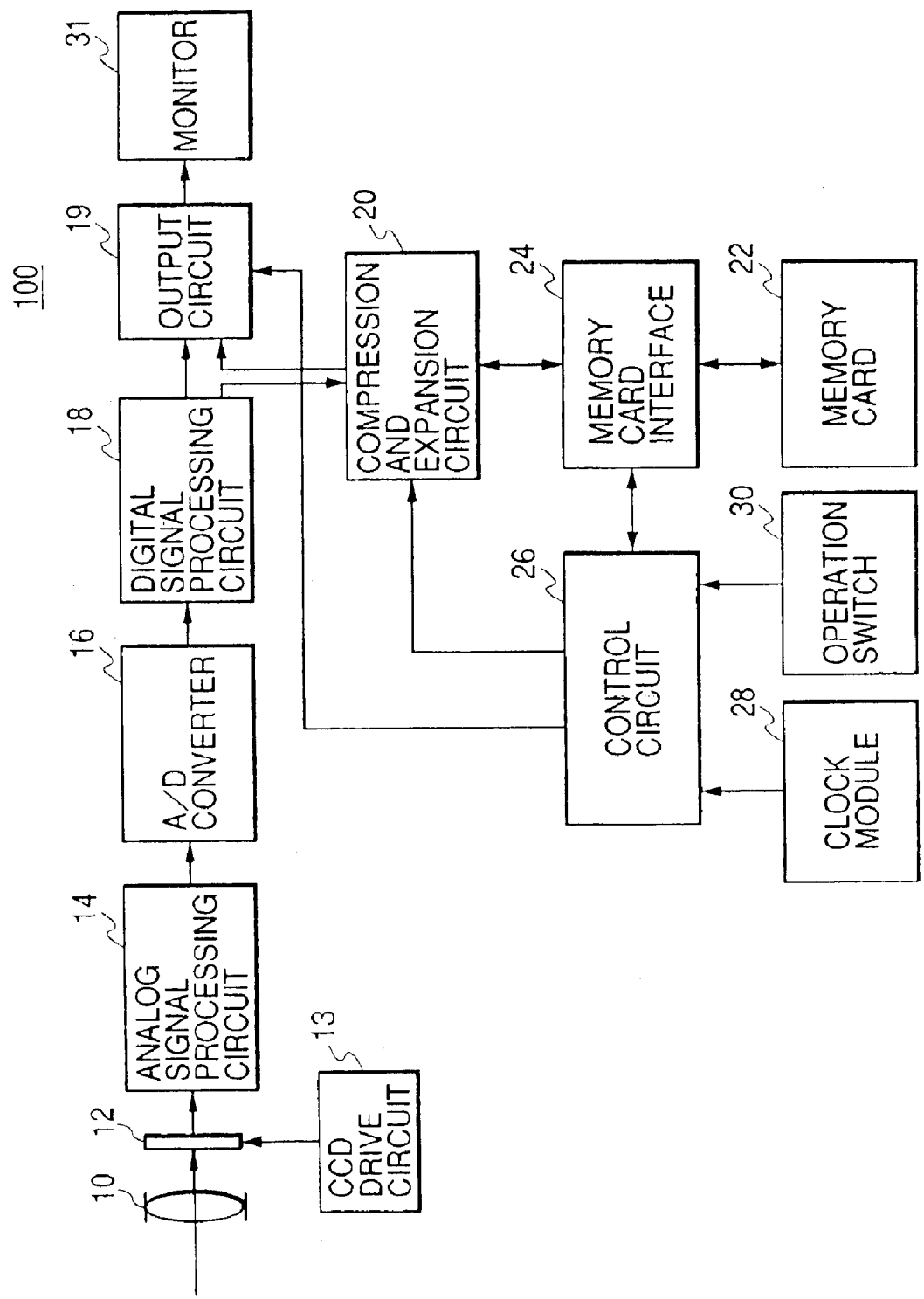
FIG. 1 is a block diagram showing an outline structure of one embodiment of the present invention.

FIG. 1 is a block diagram showing an outline construction of an image pickup apparatus 100 as an embodiment of the present invention.

In FIG. 1, reference numeral 10 is a photographic lens, being comprised, for example, of a fixed lens group for condensing light, a variable-power lens group, a diaphragm and a compensation lens group which has both a function of compensating an image-formation position which is shifted in accordance with movement of the variable-power lens group, and a function of adjusting the focus. Reference numeral 12 is a CDD-type image pickup element for converting an optical image formed by the photographic lens 10 into an electric signal. Reference numeral 13 is a CDD drive circuit for driving the image pickup element 12.

Reference numeral 14 is an analog signal processing circuit for performing predetermined analog processing on an analog output signal from the image pickup element 12. The analog signal processing circuit 14 is comprised, for example, of a CDS (co-related double sampling) circuit, an AGC circuit or the like. Reference numeral 16 is an A/D converter for converting the analog output of the analog signal processing circuit 14 into a digital signal. Reference numeral 18 is a digital signal processing circuit for performing predetermined digital processing on output data of the A/D converter 16. Reference numeral 19 is an output circuit for converting the output data from the digital signal processing circuit 18 or output from a compression and expansion circuit 20 into data of a format which is suitable for output to an external monitor 20.

Reference numeral 20 is the compression and expansion circuit for compressing and expanding an image signal according to a JPEG format or the like. Reference numeral 22 is a memory card, 24 is a memory card interface for mediating exchange of data between the memory card 22 and the compression and expansion circuit 20.

Reference numeral 26 is a control circuit for controlling the image pickup apparatus 100 as a whole, and it has a microcomputer. Reference numeral 28 is a clock module for outputting a signal indicating the current date and time, and reference numeral 30 is a operation switch for transmitting a user operation to the control circuit 26. The function of the clock module 28 may be realized by means of a timer built into the microcomputer. The operation switch 30 is comprised, for example, of a mode-switching switch, a photograph trigger switch, a zoom lever and the like.

A memory card interface 24 follows commands from the control circuit 26 and adds a designated name or the like to compressed image data from the compression and expansion circuit 20 and converts this image data into an image information file having a format determined by a file system and writes this file into the memory card 22, and also, reads a designated image file from the memory card 22 and provides it to the compression and expansion circuit 20. The image data read out from the memory card 22 is decoded and expanded by the compression and expansion circuit 22, and outputted to the output circuit 19.

Via the memory card interface 24, the control circuit 26 can create a directory in the memory card 22 and changes the name thereof, and can also execute file management such as writing to and reading from the file.

The memory card 22 has a non-volatile semiconductor memory built therein, and it is capable of being removed from the main body of the image pickup apparatus 100 via a slot which is not shown in the diagram. A circuit for controlling the non-volatile semiconductor memory inside the memory card 22 may be arranged inside the memory card 22, or may be arranged at the memory card interface 24. The file system in the memory card 22 is so constructed that it can be accessed by a personal computer.

Further, the image pickup apparatus 100 of FIG. 1 is equipped with an output circuit 19 for outputting a video signal to the external monitor 200. The user can operate the switch 30 to select and display either of the following onto the monitor 31: an image obtained by means of the image pickup element 12 and based on the image signal outputted from the digital signal processing circuit 18, or a reproduced image based on the image signal read out from the memory card 22.

The image pickup apparatus 100 of the present embodiment has a recording mode for recording onto the memory card 22 the image signal obtained by means of the image pickup element 12, and a reproduction mode for designating an image file recorded in the memory card 22 in order to reproduce or delete the file, and these modes can be switched by the user by operating the operation switch 30.

In the recording mode the control circuit 26 controls the output circuit 19 and outputs to the monitor 31 the output signal outputted from the digital signal processing circuit 18. Then, when the user controls the operation switch 30 so as to give an instruction for photographing an image, the control circuit 26 outputs a control signal to the compression and expansion circuit 20. At the time when the instruction occurs, the compression and expansion circuit 20 records into the internal memory a one-frame image signal outputted from the digital signal processing circuit 18, encodes the one-frame image signal and compress its information size. The compressed image signal is outputted to the memory card interface 24 according to an appropriate timing. The memory card interface 24 generates an image file according to the instructions from the control circuit 26, and records the image file into the designated directory in the memory card 22.

Figure 2:
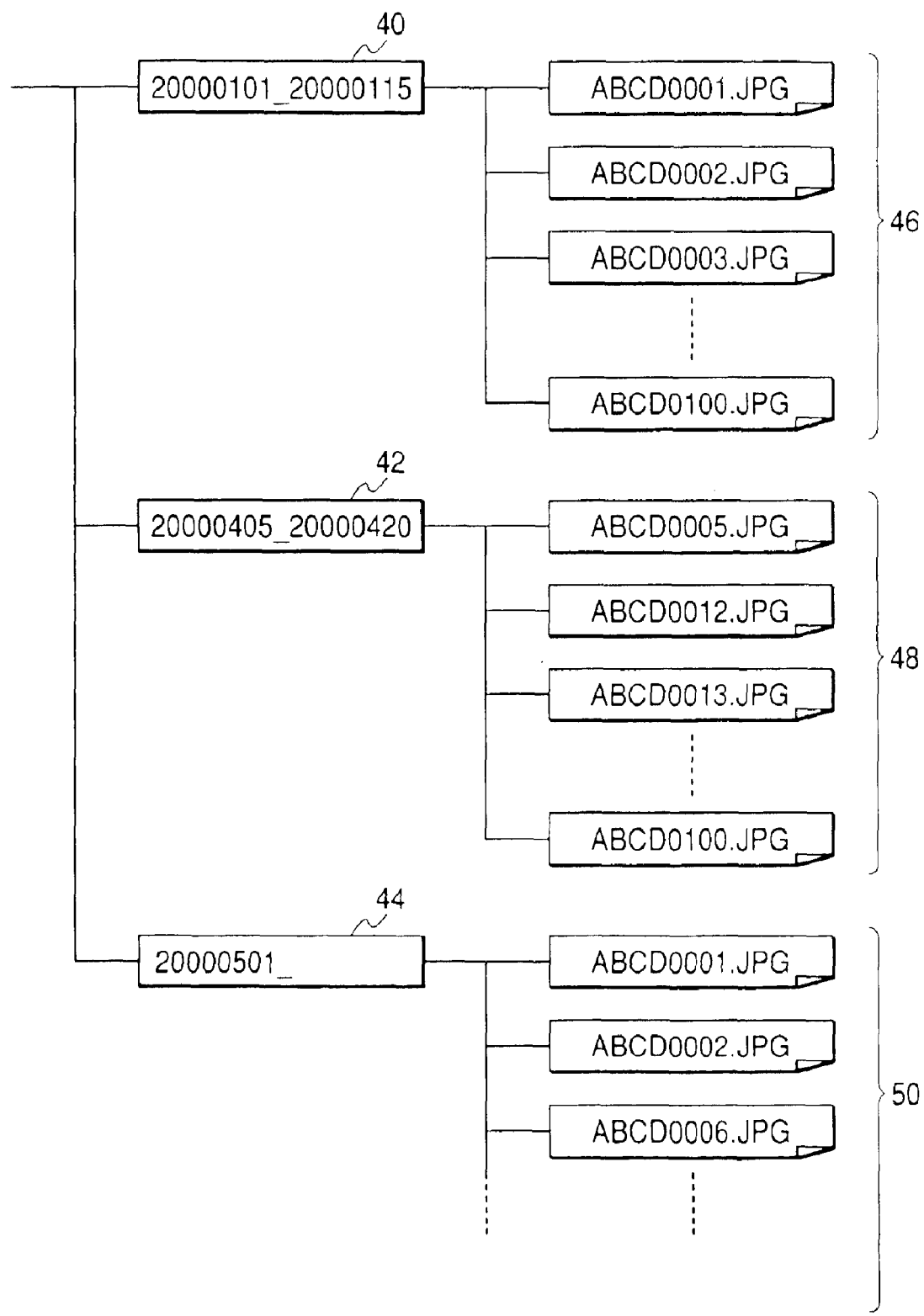
FIG. 2 is a diagram showing an example of a directory structure of the embodiment of the present invention.

FIG. 2 is a schematic diagram showing an example of a file construction in the memory card 22.

Next, explanation will be made, with reference to FIG. 2, of an operation of managing directory names in the file system in the memory card 22 according to the image pickup apparatus 100 of the present embodiment.

In FIG. 2, reference numerals 40, 42 and 44 are directories for saving compressed image files. Rules for generating names of the compressed image files are as follows.

Namely, a 4-digit character string and 4-digit numerical value, which are designated by the maker, can be positioned before the extension (which is positioned after the period) such that with each new image a value of 1 is added to the 3-digit portion within the four digits, so that the name goes from ABCD00001.jpg to ABCD0100.jpg, for example.

In the present embodiment, when the file names of a given directory reach ABCD0100.jpg, then the next image file is saved to a subsequent directory. In the present embodiment the upper five digits of the file name are fixed, but it is also possible to change them with respect to each directory.

According to the example shown in FIG. 2, a directory 40 is created at the time when a compressed file of the image which was taken first is saved. At this time, according to the present embodiment, the name containing the creation date is added to the directory 40. For example, if the directory 40 was created on Jan. 1, 2000, then the directory name will be "20000101_". In the example shown in FIG. 2, the maximum number of image files, namely image files of up to "ABCD0100.jpg" are stored in the directory 40, so the image file which is to be taken next will be stored in a second directory 42.

According to the present embodiment, when the photographed image file is to be saved to a new directory, the creation date (for example, Jan. 15, 2000) of the image file that was last stored in a directory immediately before saving into the new directory is added onto the name of that. Thus, the name of the directory 40 will be "2000101_20000115", as shown in FIG. 2.

To sum up the above explanation, the directory name in the present embodiment is "date1_" or "date1_date2". Date1 indicates the date on which the image file first stored in that directory was created, and Date2 indicates the date on which the image file that was stored last was created. Therefore, the former directory name indicates a directory in which image files may still be stored, and the latter one indicates a directory which already stores the maximum number of image files. Determining the directory names in this way enables the user to easily recognize from the directory names the dates (or ranges thereof) on which the images stored in each directory were created.

Figure 3:
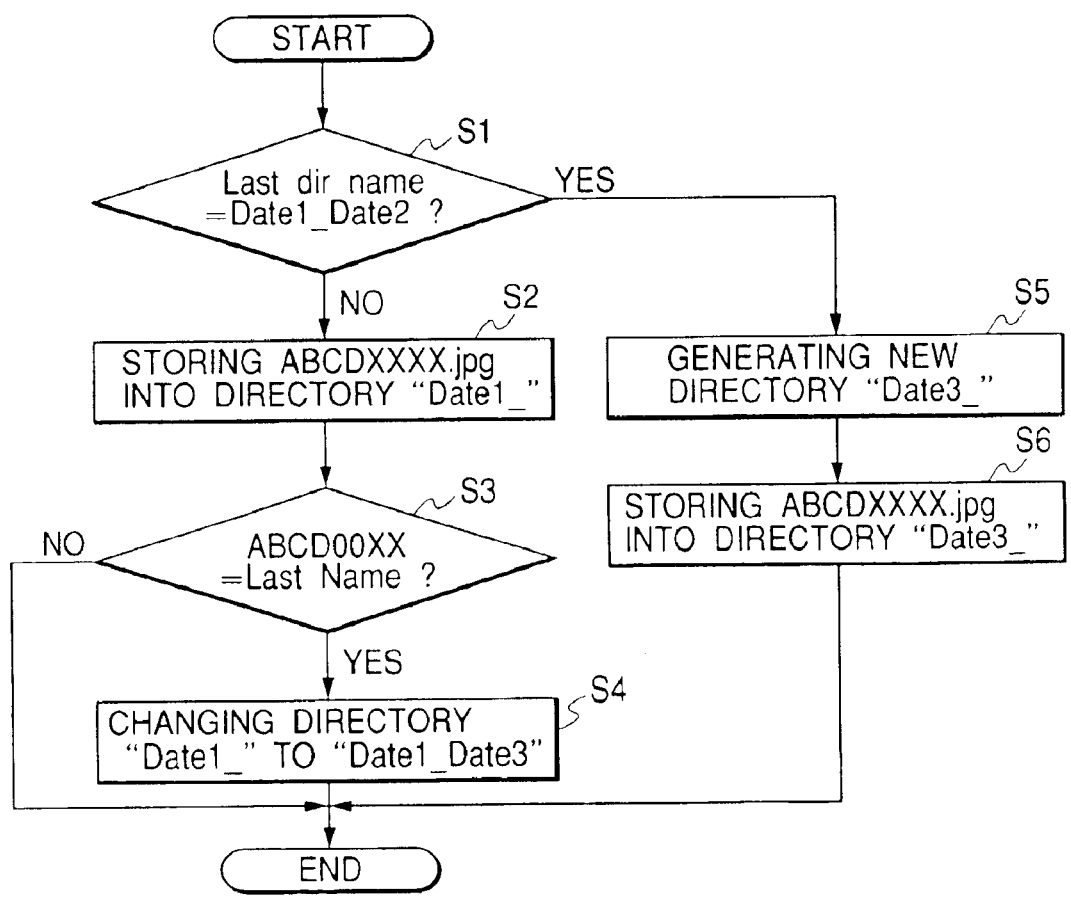
FIG. 3 is an operation flow chart of the embodiment of the present invention.

FIG. 3 is a flowchart of processes of the control circuit 26 managing and generating the directory name, which processes are performed in conjunction with the operation of taking the photographic image, in the recording mode according to the image pickup apparatus of the present embodiment. The processing shown in FIG. 3 is started when the photographing is executed by means of operations performed by the user and the compressed image data that is generated is written to the memory card 22.

A judgment is made as to whether the format of the last existing directory name (Last Dir Name) is "Date1_Date2" or not (step S1). Date1 is the creation date of that directory, and date2 is the date when the directory was closed. In the case when the last directory is still possible to store an image file, the last directory name is "Date1_". In this case the directory is open, or, it is not closed.

In the case when a newly photographed image file is to be saved in a directory (step S1), the new photographic image (i.e., the compressed image data thereof) is saved to the directory "Date1_" with the file name "ABCDXXXX.jpg" (step S2). The "XXXX" in the file name is a consecutive number, such that when there is a file "ABCD0030.jpg" inside the directory the XXXX will be 0031.

Next, confirmation is made as to whether the image file "ABCDXXXX.jpg" of the photographed image is the last image file which will be able to be stored in that directory or not (step S3). That is, confirmation is made as to whether a condition that is designated in advance as the condition for closing the directory has been met. For example, in the case when 100 image files of from "ABCD0000.jpg" to "ABCD0100.jpg" can be stored in one directory, then confirmation is made as to whether the file name of the image file which is to be stored is "ABCD0100.jpg" or not. Of course, it is also possible to count the number of image files already stored in that directory to make this judgment.

Further, in the case of a system in which the subsequent directory is created forcibly by operations performed by the user, then it is possible to make this judgement based on instructions to make the new directory.

In the case when the file will be the last image file that can be stored (step S3), an attribution of the image files being stored in that directory is detected, and a photographing date of the image file that was taken last is confirmed. Then, the name of that directory is changed from "Date1_" to "Date1_Date3". Here, Date3 is the photographing date of the image file stored last. Normally, Date3 is the present date.

In the case when the format of the name of the last existing directory (Last Dir Name) is "Date1_Date2" (step S1), a new directory "Date3_" is generated having the name corresponding to the photographing date Date3 of the image file which is to be stored (step S5), and the newly taken image file is saved to the directory "Date3_" with the file name "ABCD0001.jpg" (step S6).

The "Design rule for Camera File system" (hereinafter, referred to as "DCF"), which is the camera systems standard established by the Japan Electronics and Information Technology Industries Association, defines certain rules for the determination of directory names and file names. In order to conform to the DCF standard it is sufficient to add DCF numbers to the beginning of the directory name that has been described above. Alternatively, in a system for making an alias file indicating the directory, it is sufficient to configure the system so as to add to the alias name a date such as the date explained above.

Next, explanation will be made of a process of changing the directory name in a reproduction mode. According to the reproduction mode it is possible to reproduce an image file as designated from among the image files stored in the memory card 22, and it is also possible to delete the designated image file from the memory card 22. The directory name is changed also in the case when the range of the photographing dates of the image files stored in the directory is changed due to the deletion of the image file as described above.

In other words, when deletion of an image file stored in a directory is executed, the control circuit 26 confirms the attribution of the image file which has been designated for deletion and also the attribution of the image files stored in the directory, and the control circuit 26 detects the photographing date and time of each of the image files. Then it changes the directory name according to the detected photographing date and time.

For example, consider a case in which the photographing date is Jan. 15, 2000 for the image file which has the name ABCD0100.jpg and has been designated for deletion from the directory 40 having the name "20000101_20000115" shown in FIG. 2. In this case, the latest photographing date is detected from among the photographing dates of the image files stored in directory 40, and the directory name is changed. For example, in the case when an image file having a file name ABCD0099.jpg has the latest photographing date and its photographing date is Jan. 10, 2000, then the control circuit 26 changes the directory name to "20000101_20000110".

Hereinafter, the flow chart of FIG. 4 will be used to make explanation of processing of the control circuit 26 which is performed in conjunction with above-mentioned deletion of the file.

In the reproduction mode, when the image file which is to be deleted is designated by the user and the deletion of the file is instructed, then the operation flow shown in FIG. 4 starts.

First, the directory name of the image file designated for deletion and the attribution (i.e., photographing date) thereof is detected (step S11). Next, a detection is made to determine whether the detected photographing date is equivalent to the Date1 in the directory name, which is to say that a determination is made as to whether the detected photographing date is the same as the oldest photographing date from among photographing dates of the image files stored in that directory (step S12). In the case when the photographing date is equivalent to the Date1, then the attributions of all the image files in that directory are detected, and the oldest date from among the photographing dates of all the files in the directory is detected (step S13). Then the directory name Date1 is changed based on the oldest photographing date detected.

For example, consider a case in which the photographing date is Apr. 5, 2000 for a file which has a file name of ABCD0005.jpg and has been designated for deletion from among the image files 48 stored in the directory 42 shown in FIG. 2, and the image file having the oldest photographing date from among the remaining image files 48 is a file ABCD0012.jpg which has a photographing date of Apr. 10, 2000. In this case, the "20000405" which corresponds to the Date1 in the directory name 42 is changed to "20000410".

Further, at step S12, in the case when the photographing date of the designated image file differs from Date1, the processing proceeds immediately to step S15.

Next, at step S15, a detection is made to determine whether the directory name has become "Date1_Date2" or not, and in the case when this is not so, that is, when the directory name is simply "Date1_", then the processing ends at this point.

On the other hand, in the case when the directory name has become "Date1_Date2", then a detection is made to confirm whether the photographing date of the designated image file is the same as Date2 or not (step S16). In the case when it is not the same it is not necessary to change the directory name, and so the processing ends at this point.

Further, in the case when the photographing date of the designated image file is the same as the directory name Date2, then the latest photographing date is detected from among the photographing dates of all the image files in that directory (step S17), and the Date2 is changed based on this latest photographing date (step S18).

For example, consider a case in which the photographing date is Apr. 20, 2000 for the file which has a file name of ABCD0100.jpg and has been designated for deletion from among the image files 48 stored in the directory 42 shown in FIG. 2, and the image file having the latest photographing date from among the remaining image files 48 is a file ABCD0099.jpg which has a photographing date of Apr. 15, 2000. In this case, the "20000420" which corresponds to the Date2 in the directory name 42 is changed to "20000415".

In this way, according to the present embodiment the directory name is automatically set as a name which indicates the oldest and the latest of the photographing dates from among photographing dates of the image files being stored in that directory, so the user only needs to confirm the directory name in order to find out the range of the photographing dates of the image files stored in that directory.

Note that, in the recording mode according to the present embodiment, when a predetermined number of image files for one directory, such as the 100 image files, has been recorded, then the directory name was set according to a format of "Date1_Date2" when the next image file is to be recorded. However, another construction is possible in which the latest photographing date in the directory is detected each time the photographing of one image file is completed, and then the directory name is automatically changed to the format of "Date1_Date2". According to this construction, regardless of when the image files in the memory card 22 are verified from the PC, the user only needs to confirm the directory name in order to find out the range of the photographing dates of the image files stored in that directory.

Note that explanation was made of the present embodiment only regarding the case in which the present invention is applied to an apparatus for recording and reproducing still image files to and from a memory card. However, in addition to this, the present invention may be applied to, and can realize similar effects when used in, an apparatus which uses other recording media such as a disk medium, or the present invention can be applied to an apparatus which uses other information data files such as moving image files or voice files.

Many widely different embodiments of the present invention may be constructed without departing from the spirit and scope of the present invention. It should be understood that the present invention is not limited to the specific embodiments described in the specification, except as defined in the appended claims.

What is claimed is:

1. A recording apparatus comprising:
   a recording medium interface arranged to store an information file under a directory and record the information file on a recording medium;
   detection means for detecting creation date of the information file stored under the directory in response to a recording of the information file by said recording medium interface; and
   control means for changing a name of the directory to a name relative to the creation date detected by said detection means according to recording of the information file by said recording medium interface.

2. An apparatus according to claim 1, wherein said control means changes the name of the directory to a name indicating the creation date of a new information file, according to an addition of the new information file to the directory.

3. An apparatus according to claim 1, wherein said recording medium interface deletes a designated information file among a plurality of information files stored under the directory in response to a deletion instruction, and
   wherein said control means changes the name of the directory according to a deletion of a designated information file by said recording medium interface.

4. An apparatus according to claim 3, wherein said detection means detects the creation dates of the plurality of information files other than the designated information files stored under the directory in response to the deletion of the designated information file by said recording medium interface, and wherein said control means changes the name of the directory based on the creation dates of the plurality of information files other than the designated information file detected by said detection means in response to the deletion of the designated information file by said recording medium interface.

5. An apparatus according to claim 4, wherein said control means changes the name of the directory to a name indicating the oldest creation date and the latest creation date from among the creation dates of the plurality of information files other than the designated information file.

6. An apparatus according to claim 1, wherein said control means changes the name of the directory according to the fact that the information files stored in the directory has exceeded a predetermined number.

7. An apparatus according to claim 6, wherein said control means changes the name of the directory from a name indicating the oldest creation date from among the creation dates of the plurality of information files stored in the directory, to a name indicating both the oldest creation date and the latest creation date.

8. A recording apparatus comprising:
   a recording medium interface arranged to operate a plurality of information files recorded on a recording medium by storing under a directory the plurality of information files, said recording medium interface recording and deleting the information file on and from the recording medium;
   detecting means for detecting creation dates of the plurality of information files stored under the directory in response to an operation of the information file by said recording medium interface; and,
   control means for detecting a range of the creation dates of the plurality of information files stored under the directory according to the creation dates of the plurality of information files detected by said detecting means and changing a name of the directory according to the range of the creation dates.

9. An apparatus according to claim 8, wherein said control means changes the name of the directory to a name indicating the range of the creation dates.

10. An apparatus according to claim 8, wherein said detecting means detects the creation dates of the plurality of information files stored under the directory in response to a recording of a new information file on the recording medium by said recording medium interface, and wherein said control means changes the name of the directory in response to the recording of the new information file on the recording medium.

11. An apparatus according to claim 8, wherein said detecting means detects the creation dates of the plurality of information files stored under the directory in response to a deletion of the information file from the recording medium by said recording medium interface, and wherein said control means changes the name of the directory in response to the deletion of the information file from the recording medium.

12. An apparatus according to claim 8, further comprising image pickup means, wherein the information file having image data obtained by said image pickup means.

13. A recording apparatus comprising:
   writing means for storing an information file under a directory and writing the information file on a recording medium;
   detection means for detecting attribution values of a plurality of information files stored under the directory in response to a writing of a new information file by said writing means; and
   control means for changing a name of the directory to a name relative to the attribution values detected by said detection means, according to the writing of the new information file by said writing means.

14. An apparatus according to claim 13, wherein said control means changes the name of the directory according to the fact that the number of the information files stored in the directory has exceeded a predetermined number by the writing of the new information file on the recording medium.

15. An apparatus according to claim 13, wherein control means detects a range of the attribution values of a plurality of information files stored under the directory according to the attribution values detected by said detection means and changes the name of the directory to a name indicating the range of the attribution values.

16. An apparatus according to claim 13, wherein said writing means deletes the information file from said recording medium, wherein said detection means detects the attribution values of a plurality of information files stored under the directory in response to a deletion of the information file by said writing means, and wherein said control means changes the name of the directory according to the deletion of the information file.

17. A recording apparatus comprising:
a writing means for storing an information file under a first directory and writing the information file on a recording medium, said writing means generating a second directory in response to an instruction to generate a new directory;
detection means for detecting attribution values of a plurality of the information files stored under a first directory in response to the instruction to generate a new directory; and
control means for changing a name of the first directory to a name relative to the attribution values detected by said detection means, according to the instruction generate a new directory.

18. A method of recording information files, comprising the steps of:
storing an information file under a directory with a recording medium interface, to record the information file on a recording medium;
detecting creation date of the information file stored under the directory in response to a recording of the information file by said storing step; and
effecting a control to change a name of the directory to a name relative to the creation date detected in said detection step, according to recording of the information file by said storing step.

19. A method according to claim 18, wherein, said controlling step includes a step of changing the name of the directory to a name indicating the creation date of a new information file, according to an addition of the new information file to the directory.

20. A method according to claim 18, wherein said storing step includes a step of deleting a designated information file among a plurality of information files stored under the directory in response to a deletion instruction, and wherein said controlling step includes a step of changing the name of the directory according to a deletion of a designated information file by said deleting step.

21. A method according to claim 20, wherein said detecting step detects the creation dates of the plurality of information files other than the designated information file stored under the directory in response to the deletion of the designated information file by said deleting step, and wherein said controlling step includes a step of changing the name of the directory based on the creation dates of the plurality of information files other than the designated information file detected in said detecting step in response to the deletion of the designated information file by said deleting step.

22. A method according to claim 21, wherein, said controlling step includes a step of changing the name of the directory to a name indicating the oldest creation date and the latest creation date from among the creation dates of the plurality of information files other than the designated information file.

23. A method according to claim 18, wherein said controlling step includes a step of changing the name of the directory according to the fact that the information files stored in the directory has exceeded a predetermined number.

24. A method according to claim 23, wherein said controlling step includes a step of changing the name of the directory from a name indicating the oldest creation date from among the creation dates of the plurality of information files stored in the directory, to a name indicating both the oldest creation date and the latest creation date.

25. A method of recording information files, comprising the steps of:
operating with a recording medium interface, a plurality of information files, recorded on a recording medium by storing under a directory the plurality of information files, said operating step including a step of recording and deleting the information file on and from the recording medium with said recording medium interface;
detecting creation dates of the plurality of information files stored under the directory in response to an operation of the information file by said operating step; and
effecting control to detect a range of the creation dates of the plurality of information files stored under the directory according to the creation dates of the plurality of information files detected in said detecting step and change a name of the directory according to the range of the creation dates.

26. A method according to claim 25, wherein, said controlling step includes a step of changing the name of the directory to a name indicating the range of the creation dates.

27. A method according to claim 25, wherein, said detecting step detects the creation dates of the plurality of information files stored under the director in response to a recording of a new information file on the recording medium by said recording medium interface, and wherein said control step changes the name of the directory in response to the recording of the new information file on the recording medium.

28. A method according to claim 25, wherein, said detecting step detects the creation dates of the plurality of information files stored under the directory in response to a deletion of the information file from the recording medium by said recording and deleting step, and wherein said control step changes the name of the directory in response to the deletion of the information file from the recording medium.

29. A method according to claim 25, further comprising an image pickup step, wherein the information file having image data obtained in said image pickup step.

30. A method of recording information files, comprising the steps of:
storing an information file under a directory and writing the information file to a recording medium;
detecting attribution values of a plurality of information files stored under the directory in response to a writing of a new information file by said storing and writing step; and effecting a control for changing a name of the directory to a name relative to the attribution values detected in said detection step, according to the writing of the new information file by said storing and writing step.

31. A method according to claim 30, wherein, said controlling step includes a step of changing the name of the directory according to the fact that the number of the information files stored in the directory has exceeded a predetermined number by the writing of the new information file on the recording medium.

32. A method according to claim 30, wherein, said controlling step includes a step of detecting a range of the attribution values of a plurality of information files stored under the directory according to the attribution values detected in said detecting step and changing the name of the directory to a name indicating the range of the attribution values.

33. A method according to claim 30, wherein, said storing and writing step includes a step of detecting the information file from said recording medium, wherein said attribution values detecting step detects the attribution values of a plurality of information files stored under the directory in response to a deletion of the information file by said storing and writing step, and wherein said control step changes the name of the directory according to the deletion of the information file.

34. A method of recording information files, comprising the steps of:

storing an information file under a first directory and writing the information file on a recording medium, said storing step including a step of generating a second directory in response to an instruction to generate a new directory;

detecting attribution values of a plurality of information files stored under the first directory in response to the instruction to generate a new directory; and effecting a control for changing a name of the first directory name relative to the attribution values detected in said detection step, according to the instruction to generate a new directory.

35. A recording apparatus comprising:

recording means for recording information files on a recording medium;

managing means for generating a plurality of groups each including a plurality of information files recorded on the recording medium;

detection means for detecting creation dates of the plurality of information files in the plurality of groups; and control means for detecting a range of the creation dates of the plurality of information files included in each of the plurality of groups according to the creation dates detected by said detection means and determining each name of the plurality of groups to a name indicative of the range of the creation dates of the plurality of information files included in each of the plurality of groups.

* * * * *

UNITED STATES PATENT AND TRADEMARK OFFICE
CERTIFICATE OF CORRECTION

| | | |
|---|---|---|
| PATENT NO. | : 6,920,466 B2 | Page 1 of 1 |
| APPLICATION NO. | : 10/014061 | |
| DATED | : July 19, 2005 | |
| INVENTOR(S) | : Kudo | |

It is certified that error appears in the above-identified patent and that said Letters Patent is hereby corrected as shown below:

In Column 9, Line 34 and 35, Claim 17 change "instruction generate" to --instruction to generate--.

Signed and Sealed this

Fourth Day of September, 2007

JON W. DUDAS
*Director of the United States Patent and Trademark Office*